Figure 1:
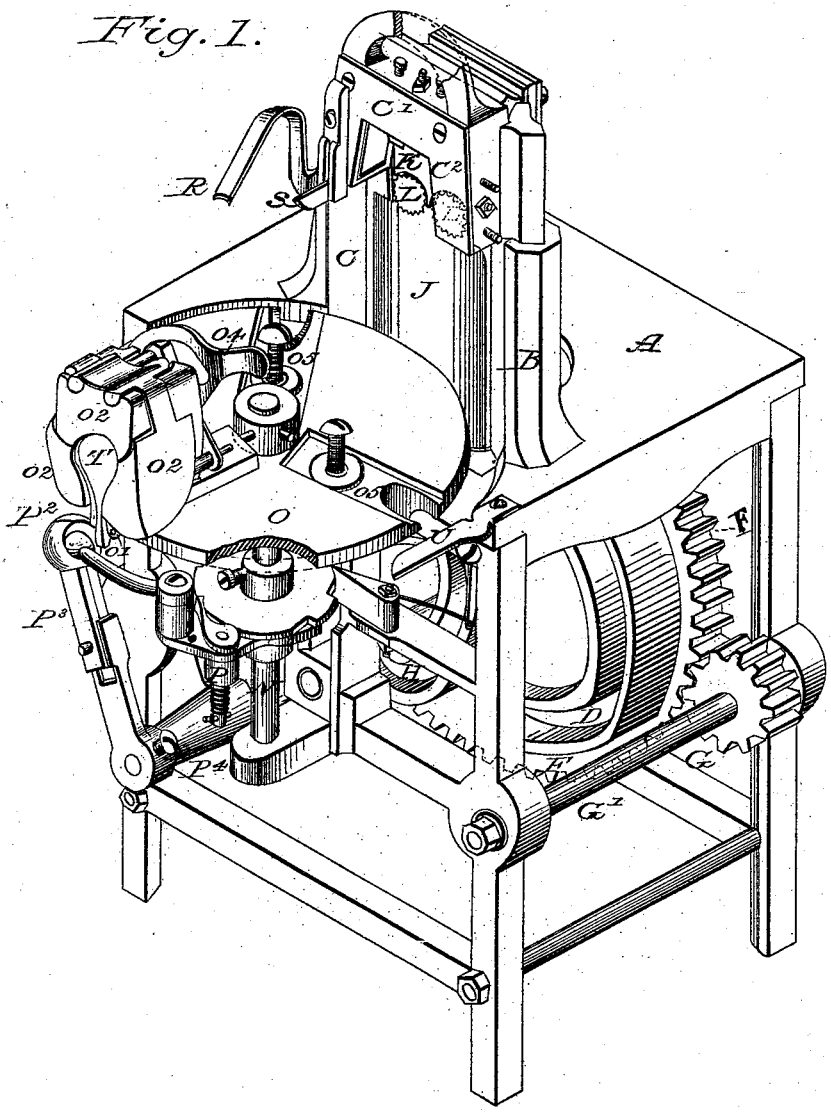

(Model.)

2 Sheets—Sheet 1.

S. PRIOR.
Machinery for Molding Boot and Shoe Stiffeners.

No. 235,962.     Patented Dec. 28, 1880.

Witnesses:
Samuel Walker, Jr.
Edmund B. Leaming

Inventor:
Samuel Prior (Model.) 2 Sheets—Sheet 2.
S. PRIOR.
Machinery for Molding Boot and Shoe Stiffeners.
No. 235,962. Patented Dec. 28, 1880.
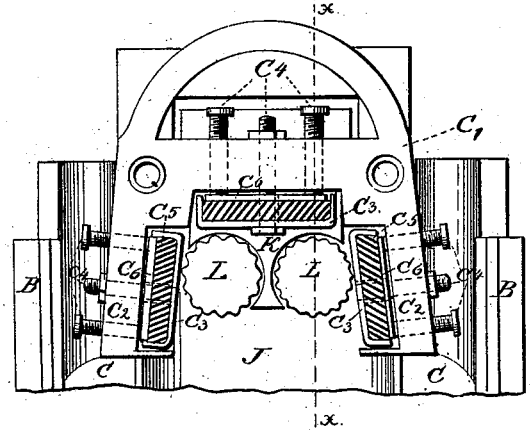
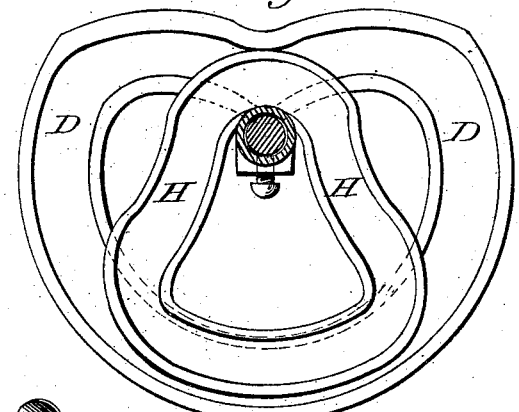
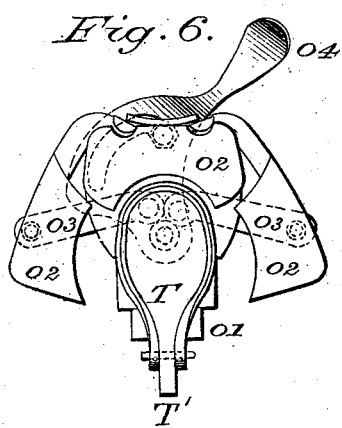
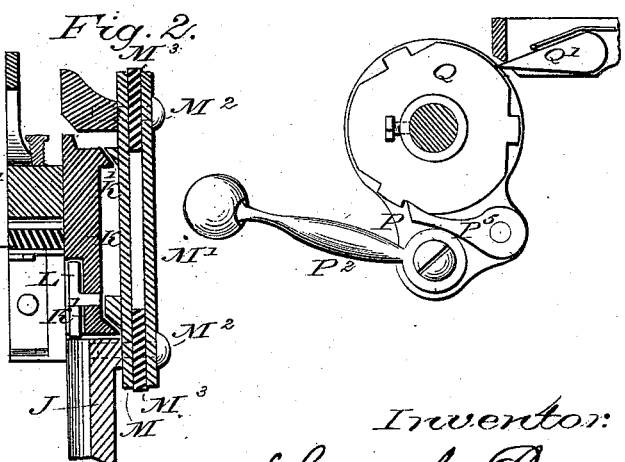
Witnesses:
Samuel Walker, Jr.
Edmund B. Leaming
Inventor:
Samuel Prior

UNITED STATES PATENT OFFICE.

SAMUEL PRIOR, OF TRENTON, NEW JERSEY.

MACHINERY FOR MOLDING BOOT AND SHOE STIFFENERS.

SPECIFICATION forming part of Letters Patent No. 235,962, dated December 28, 1880.

Application filed March 26, 1880. (Model.)

*To all whom it may concern:*

Be it known that I, SAMUEL PRIOR, of the city of Trenton, in the State of New Jersey, have invented certain new and useful Improvements in Processes and Machinery for Molding Boot and Shoe Stiffeners, of which the following is a full, clear, concise, and exact description, reference being had to the accompanying drawings, making a part thereof, and in which drawings similar letters of reference refer to similar parts.

My invention relates to the forming of a stiffener for boots and shoes complete at one operation. My machinery is also so arranged that while one blank is being placed within the mold another blank is receiving the requisite pressure and consequent conformation in another mold, and still another blank is being discharged perfectly formed from still another mold, thus allowing of a continuous presentation for pressure and consequent formation. My machinery is also so arranged that my stiffeners are molded by a pressure exerted evenly upon every part of the stiffener at one and the same time. It is also so arranged that the flange or upturn of the stiffener is formed by turning it in and pressing it into shape by one means and operation, while the stiffener is being held firmly in place and is receiving its conformation by pressure applied to all parts of it. I also claim by the use of my machinery and processes absolute freedom from danger of the operator while feeding the blanks into the mold. I also claim the further advantage of having my machinery so adapted to its work as to obviate all liability of abrasion of the surface of the stiffener in forming and pressing it.

Figure 1 shows a perspective view of my machine. In this drawing, for sake of clearness, but one mold or former is shown. Fig. 2 is a sectional view of the head of my press and plate, &c., as indicated by the dotted line $x$ $x$ in Fig. 5. Fig. 3 is a view of my covered cams, showing their relative arrangement and several forms. Fig. 4 shows my device for alternately rotating and holding firmly in place the machinery for carrying the mold under the press. Fig. 5 shows my apparatus for pressing the stiffener and forming its flange. Fig. 6 shows my mold with its female mold devices for operating the same, &c.

In Fig. 1 A represents the upper part of the frame of the machine. This is provided with upwardly-projecting guides B B, the upper ends of which guides are also seen at B B, Fig. 5. In these guides are grooves, in which moves freely up and down the slide C. From this slide projects downward an arm made integral with it. Upon this arm is a friction roller or wheel, axled at right angles with the line of length of the arm. This roller plays in the covered cam D. This covered cam D is fixed upon a shaft, upon which shaft is fixed the cog-wheel F, gearing into the pinion G, upon the driving-shaft G'. Upon the shaft bearing the covered cam D is another covered cam, H.

In the slide C are grooves, in which moves freely up and down another slide, J. This slide J also has an arm projecting beneath, provided with a roller or wheel, which plays freely in the covered cam H. These covered cams are shown more clearly in Fig. 3.

The slide J is provided with an opening, in which is placed the movable plate K. This plate is provided near its lower end with two small wheels or disks, with either plain or corrugated faces, and turning freely upon pins or axes let into the plate. These disks are preferably countersunk so that the face of the disks are even, or nearly so, with the surface of the plate. The plate K is also provided with beveled projections, as shown at K' K', Fig. 2.

The slide J rests against the plate M. There is still a further plate, M'. These plates M and M' are fastened to the slide J by adjustable screws $M^2$ $M^2$. Between the plates M and M' small plates of rubber or other elastic material, $M^3$ $M^3$, are provided, held in place by the screws $M^2$ $M^2$, as shown in Fig. 2. The plate M is provided with beveled projections, corresponding to the beveled projections K' K' in the movable plate K.

The slide C is provided with a head, C', and wedge-shaped press $C^2$ $C^2$, as shown at Fig. 5. These together constitute the press. This press is provided with plates $C^3$ $C^3$ $C^3$, small inner plates, $C^6$ $C^6$ $C^6$, strips of india-rubber or other elastic material $C^5$ $C^5$ $C^5$, and adjustable screws $C^4$ $C^4$ $C^4$.

To my frame I attach the upright shaft N, Fig. 1. At the top of this shaft I place the circular table or disk O. Upon this table I place my molds and formers. One of these is shown at O'. The depressions to receive the others are shown at $O^5$ $O^5$.

To secure clearness in the drawings I have only placed one mold in position. The number used is not material, though I usually use three, and have so gaged the action of the shaft. This mold or former O' is provided with the die or female $O^2$, made in three pieces hinged together, and connected together and with the mold O' by the system of hinged levers shown by the dotted lines in Fig. 6, the levers $O^3$ $O^3$ being hinged at their outer ends to the pieces $O^2$ $O^2$ and at their inner ends to the mold O'. To the rear of the mold O' is hinged a cam-shaped lever, $O^4$. In the cam of this lever plays a projecting pin fastened in the top piece $O^2$. These levers are so arranged that raising the lever $O^4$ raises the top piece $O^2$. The side pieces $O^2$ $O^2$ being hinged to this, as shown, are raised with it, and by the action of the levers $O^3$ $O^3$ are thrown outwardly from the mold O'.

Upon the upright shaft N, and moving freely upon it, I place a cam-and-lever wheel, P, provided with a movable arm or lever, $P^2$, and pawl $P^5$, (shown in Fig. 4.) Immediately above this I place on the same shaft, and fixed rigidly to it, a ratchet-wheel, Q, provided with a pawl, Q', attached at its pivotal end to the frame of the machine. The arm $P^2$ is connected, by means of the extensible arm $P^3$, shaft $P^4$, and arm (not shown) and roller, with the covered cam H.

Having thus described the construction of my machine, I will now describe its mode of operation, and in this description I will, as before, only place one mold in position.

The lever $O^4$ being raised and the pieces $O^2$ $O^2$ $O^2$ thrown upward and outwardly from the mold or former O', a blank for a stiffener is placed upon the former O'. By means of the cam H, the arm, and the shaft $P^4$ the extensible arm $P^3$, the arm $P^2$, the cam-and-lever-wheel P, the pawl $P^5$, and the ratchet-wheel Q, motion is imparted to the upright shaft N. The rotation of the shaft N carries with it the circular table O and the mold O' and attachments. The lever $O^4$ engages against the guard R, and being depressed by it, brings the pieces $O^2$ $O^2$ $O^2$ forming the female mold firmly down upon and against the blank. These pieces hold the blank firmly in position with only so much of the blank projecting from the mold as is needed for the flange or upturn, and the shaft N still rotating, brings the mold O' charged with the blank beneath the press C'. Arrived there, the shaft N ceases rotating, and the slide C descends by the action of the cam H, the head C' presses firmly upon the top piece, $O^2$, and the wedge-shaped press $C^2$ $C^2$ exert an equal pressure upon the side pieces $O^2$ $O^2$. The blank is held thus firmly in the mold, and receives pressure from all sides, giving it the proper form. While thus held and pressed, the slide J, by the action of the cam D, descends, the disks L L engaging against the projecting portion of the blank, the plate K is lifted, the beveled projections K' K' engage against the corresponding bevels on the plate M, and the plate K, with the disks L L, is thrown closely against the blank. The slide J still continuing to descend, the disks engage still more firmly against the projecting part of the blank, their inner under edges begin to revolve toward each other, the projecting of the blank is neatly turned over, and the slide J, still descending, firmly pressed down by the disks L L and the plate K, thus forming a perfect flange or upturn to the stiffener. This done, and the stiffener completely formed, and by means of the strong and continued pressure permanently formed, the slide J commences to rise, the plate K falls back into its former position, clear of the flange, and the slide J effects its complete rise without the plate or disks touching the flange. The slide J having risen, the slide C rises and releases the mold and stiffener from pressure. As it rises the short hinged lever S (which in the descent of the slide G had folded up, pressed behind, and opened underneath the lever $O^2$) raises the lever $O^4$, and throws the pieces $O^2$ $O^2$ $O^2$ off and away from the formed stiffener. Meanwhile the extensible arm $P^3$, by means of the cam H, has been thrown forward, the pawl $P^5$ has engaged the ratchet Q, the cam-and-lever wheel P has thrown back the pawl Q', the cam H again does its work, the circular table is again rotated, and the mold is carried forward from under the press.

The mold O' is provided with a cast-off, T, held in place by a concealed spring. Over this cast-off the flange of the stiffener projects. As the mold is carried forward from under the press the bottom T of this cast-off, which acts as a short lever, engages against the guard U, throws outwardly the cast-off, and the stiffener is ejected.

By means of the adjustable screws $C^4$ $C^4$ $C^4$ $C^4$ $C^4$ $C^4$ $C^4$ $C^4$ $C^4$ and $M^2$ $M^2$, I am enabled to form stiffeners of material of different thicknesses, and by means of the small pieces of rubber or other elastic material behind the plates $C^3$ $C^3$ $C^3$ and between the plates M and M', I am enabled to work material slightly varying in thickness without adjusting the screws.

Having thus described my machine and its mode of operation, what I claim as my invention, and desire to secure by Letters Patent, is—

1. In a machine for forming boot and shoe stiffeners, the disk O, attached to an upright shaft rotated by appropriate mechanism, and bearing upon its upper surface one or more molds, in combination with the guard R, substantially as shown and described.

2. In a machine for forming boot and shoe stiffeners, the mold O', with its cast-off T, in combination with the female mold composed of a movable head-piece, $O^2$, forming part of the shaping apparatus, and arranged to engage directly upon the stiffener and the side pieces, $O^2 O^2$, substantially as shown.

3. In a machine for forming boot and shoe stiffeners, in combination with a mold or former and female mold constructed substantially as shown and described, the levers $O^3 O^3$ and the cam-shaped lever $O^4$, all connected and arranged substantially as and for the purpose set forth.

4. In a machine for forming boot and shoe stiffeners, in combination with the mold or former $O'$, the cast-off T, with its lever end $T'$, substantially as described, and for the purpose set forth.

5. In a machine for forming boot and shoe stiffeners, the slide C, with its head $C'$ and wedge-shaped press $C^2 C^2$, for the purpose set forth.

6. In a machine for forming boot and shoe stiffeners, the adjustable screws $C^4 C^4 C^4 C^4 C^4 C^4 C^4 C^4 C^4$, the adjustable plates $C^3 C^3 C^3$, the rubber or elastic plates $C^5 C^5 C^5$, the inner plates, $C^6$, in combination with the head $C'$ and a wedge-shaped press.

7. In a machine for forming boot and shoe stiffeners, in combination with the mold $O'$ and female mold $O^2$, the slide C, with its head $C'$ and its wedge-shaped press $C^2 C^2$.

8. In a machine for forming boot and shoe stiffeners, in combination with the mold $O'$ and female mold $O^2$, the slide C, with its head $C'$ and its wedge-shaped press $C^2$, provided with the adjustable screws $C^4$, adjustable plates $C^3$ and $C^6$, and elastic plates $C^5$, substantially as shown.

9. In a machine for forming boot and shoe stiffeners, the slide C, in combination with the slide J, moving in grooves in the slide C, but moving independently of it, arranged and constructed substantially as described.

10. In a machine for forming boot and shoe stiffeners, the slide J and the plate K, with its revolving disks L L, substantially as described.

11. In a machine for forming boot and shoe stiffeners, mechanism for turning over and pressing the flange or upturn, consisting of disks arranged in pairs and revolved either by mechanism or by contact with the flange and moved along and against the flange by appropriate means, the disks having corrugated faces, and arranged and operated substantially as shown and described.

12. In a machine for forming boot and shoe stiffeners, the plate K, with revolving disks L L and beveled projections $K' K'$, arranged and constructed substantially as shown.

13. In a machine for forming boot and shoe stiffeners, the plate K, with its disks and its beveled projections $K'$, in combination with the plate M, with its corresponding beveled projections, substantially as shown.

14. In a machine for forming boot and shoe stiffeners, the plate K, with its beveled projections $K'$, the plate M, with corresponding beveled projections, the elastic plates $M^3 M^3$, the adjustable screws $M^2 M^2$, and the plate $M'$, all combined and arranged substantially as described, and for the purpose set forth.

15. In a machine for forming boot and shoe stiffeners, in combination with the slide C, the short lever S, arranged and operated substantially as shown and described, and for the purpose set forth.

16. In a machine for forming boot and shoe stiffeners, in combination with the lever $O^4$, the guard R, substantially as shown, and as and for the purpose set forth.

17. In a machine for forming boot and shoe stiffeners, the guard U, in combination with the lever end $T'$, as and for the purpose set forth.

18. In a machine for forming boot and shoe stiffeners, the shaft N, bearing the disk O, the ratchet-wheel Q, fixed rigidly to the shaft N, and the pawl $Q'$, all combined and arranged substantially as shown.

19. In a machine for forming boot and shoe stiffeners, in combination with the upright shaft N, bearing the disk O, with ratchet-wheel fixed rigidly to the shaft, the cam-and-lever wheel P, with its pawl $P^5$, all substantially as described.

20. In a machine for forming boot and shoe stiffeners, the upright shaft N, disk O, cam-and-lever wheel P, pawl $P^5$, ratchet-wheel Q, pawl $Q'$, in combination with the connecting-arm $P^2$ and extensible arm $P^3$, substantially as described.

21. In a machine for forming boot and shoe stiffeners, the covered cams D and H, arranged rigidly upon the same shaft and shaped and arranged substantially as shown, by which they impart the requisite motion and allow the requisite inaction at the requisite periods to the slides C and J by the revolution of one common shaft.

22. In a machine for forming boot and shoe stiffeners, the covered cam H, connected by means of appropriate mechanism with the slide C and also with the upright shaft N, substantially as set forth.

SAMUEL PRIOR.

Witnesses:
  E. B. LEAMING,
  SAMUEL WALKER, Jr.